United States Patent
Ishizuka et al.

(10) Patent No.: US 11,114,066 B2
(45) Date of Patent: Sep. 7, 2021

(54) PATH DISPLAY DEVICE AND PATH DISPLAY METHOD

(71) Applicant: Nippon Telegraph and Telephone Corporation, Tokyo (JP)

(72) Inventors: Yuichiro Ishizuka, Tokyo (JP); Osamu Okino, Tokyo (JP); Hiroyuki Oyanagi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/978,308

(22) PCT Filed: Mar. 1, 2019

(86) PCT No.: PCT/JP2019/007990
§ 371 (c)(1),
(2) Date: Sep. 4, 2020

(87) PCT Pub. No.: WO2019/172099
PCT Pub. Date: Sep. 12, 2019

(65) Prior Publication Data
US 2021/0005163 A1    Jan. 7, 2021

(30) Foreign Application Priority Data
Mar. 8, 2018    (JP) .............................. JP2018-041429

(51) Int. Cl.
*G09G 5/36* (2006.01)
*H04L 12/26* (2006.01)

(52) U.S. Cl.
CPC ............. *G09G 5/36* (2013.01); *H04L 43/045* (2013.01); *H04L 43/065* (2013.01)

(58) Field of Classification Search
CPC ... G09G 5/36; G09G 5/00; G09G 5/08; H04L 43/065; H04L 43/045; H04L 41/22; H04L 41/08; H04L 41/0893; H04L 12/26
See application file for complete search history.

(56) References Cited

U.S. PATENT DOCUMENTS

2009/0190921 A1* 7/2009 Nakajima .......... G01M 11/3136
                                                    398/13
2010/0138750 A1* 6/2010 Trinler .................... H04L 41/22
                                                    715/736

OTHER PUBLICATIONS

Itpro.nikkeibp.co.jp, [online], "Quick-Learning Course—Optical Networks Becoming Familiar," Nov. 15, 2005, retrieved on Jan. 23, 2018, retrieved from URL<http://itpro.nikkeibp.co.jp/article/COLUMN/20060607/240199/?rt=nocnt>, 11 pages (with English Translation).

(Continued)

*Primary Examiner* — Xilin Guo
(74) *Attorney, Agent, or Firm* — Fish & Richardson P.C.

(57) ABSTRACT

The operability of path management performed in units of apparatuses subdivided by disaggregation is improved.
A path display apparatus 1 which displays a path configured for a plurality of optical network apparatuses subdivided by disaggregation includes a storage unit 10 that stores configuration information 11 indicating a section of each of the optical network apparatuses; a grouping unit 21 that identifies a high-speed port of a route apparatus (DIR: Direction) which is the optical network apparatus, and determines a first group to which optical network apparatuses divided by the identified high-speed port belong, based on the configuration information 11; and a display control unit 22 that displays, on a screen, a symbol of each of the optical network apparatuses, a symbol of the section, and a symbol of the first group.

5 Claims, 6 Drawing Sheets

(56) References Cited

OTHER PUBLICATIONS

Optronics-media.com, [online], "Fujitsu Launches Optical Disaggregation System," Mar. 23, 2016, retrieved on Jan. 1, 2018, retrieved from URL<http://www.optronics-media.com/news/20160323/40472/>, 7 pages (with English Translation).

* cited by examiner

PATH DISPLAY DEVICE AND PATH DISPLAY METHOD

CROSS-REFERENCE TO RELATED APPLICATIONS

This application is a National Stage application under 35 U.S.C. § 371 of International Application No. PCT/JP2019/007990 having an International Filing Date of Mar. 1, 2019, which claims priority to Japanese Application Serial No. 2018-041429, filed on Mar. 8, 2018. The disclosure of the prior application is considered part of the disclosure of this application, and is incorporated in its entirety into this application.

TECHNICAL FIELD

The present disclosure relates to a path display apparatus and a path display method.

BACKGROUND ART

Figure 6:
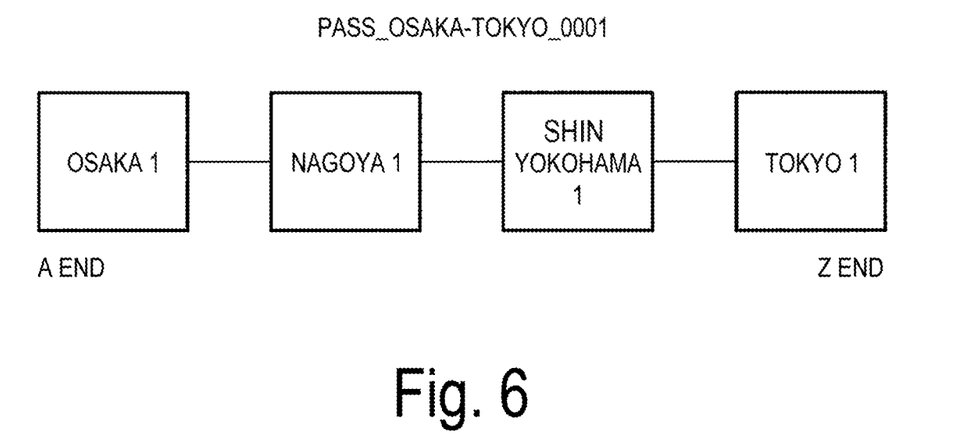
FIG. 6 is a path screen display example in the related art.

Non-Patent Literature 1 discloses a reconfigurable optical add/drop multiplexer (ROADM) system. Non-Patent Literature 1 describes "an operation support system issues control commands of ADD, THRU, and DROP to each ROADM node", and realizes path configuration of an all-in-one optical transmission apparatus (ROADM node). According to Non-Patent Literature 1, the operation support system ((OSS): a monitoring control system) performs path management in units of apparatuses, and displays a path in units of apparatuses by a path display function of the operation support system. FIG. 6 illustrates an example in which a display unit of OSS displays on a screen, a path configured across apparatuses (Osaka 1, Nagoya 1, Shin-Yokohama 1, and Tokyo 1) respectively disposed in Osaka, Nagoya, Shin-Yokohama, and Tokyo, as a path screen display in the related art.

On the other hand, Non-Patent Literature 2 discloses disaggregation in an optical transmission system. The disaggregation in the optical transmission system refers to enabling flexible network configuration by making apparatuses constituting the optical transmission system into components and enabling the components to be connected to each other. Non-Patent Literature 2 describes "functions of transport, WDM, switch, and access necessary for constructing an optical transmission network are provided as blades". In other words, according to Non-Patent Literature 2, an all-in-one optical transmission apparatus in the related art is split into respective functions, and a component having a transport function, a component having WDM, a component having a switch function, and a component having an access function are appropriately introduced into the optical transmission system.

CITATION LIST

Non Patent Literature

Non-Patent Literature 1: "key points of a network to learn in a week, quick course, familiar optical network (15), "ROADM" which can freely operate an optical network", [online], [Search on Feb. 27, 2018], Internet <URL:http://itpro.nikkeibp.co.jp/article/COLUMN/20060607/240199/? rt=nocnt>
Non-Patent Literature 2: "FUJITSU launches disaggregation in an optical transmission system", [online], [Search on Feb. 27, 2018], Internet <URL:http://www.optronics-media.com/news/20160323/40472/>

SUMMARY OF THE INVENTION

Technical Problem

Based on Non-Patent Literatures 1 and 2, the OSS performs path management in units of subdivided apparatuses, by apparatus disaggregation. Such path management corresponds to path management performed in units of functions of an all-in-one optical transmission apparatus, that is, an optical transmission apparatus of a non-disaggregation configuration in the related art. This increases the number of apparatuses on the path and complicates the path management. In addition, the display unit of the OSS displays a path in units of subdivided apparatuses. Such a path display is a very detailed display and is complicated, which causes a reduction in visibility of the path display and may cause a decrease in operability of an operator who performs path management.

In particular, the path display in units of subdivided apparatuses is a display in which connection, originally unnecessary, by the internal wiring of the apparatus of a non-disaggregation configuration is connection by sections. Thus, it is difficult for an operator to distinguish whether connections are achieved by sections between the apparatuses of a non-disaggregation configuration or by sections corresponding to the components in the apparatuses of a non-disaggregation configuration, which may lead to reduced operability.

In view of this background, an object of the present disclosure is to improve the operability of path management performed in units of apparatuses subdivided by disaggregation.

Means for Solving the Problem

In order to solve the problems described above, the disclosure according to claim 1 is a path display apparatus for displaying a path configured for a plurality of optical network apparatuses subdivided by disaggregation, including a storage unit that stores configuration information indicating a connection relationship of each of the optical network apparatuses; a grouping unit that identifies a high-speed port of a route apparatus which is the optical network apparatus, and determines a first group to which optical network apparatuses divided by the identified high-speed port belong, based on the configuration information; and a display control unit that displays, on a screen, a symbol of each of the optical network apparatuses, a symbol of the connection relationship, and a symbol of the first group.

The disclosure according to claim 5 is a path display method at a path display apparatus for displaying a path configured for a plurality of optical network apparatuses subdivided by disaggregation, a storage unit of the path display apparatus storing configuration information, the configuration information indicating a connection relationship of each of the optical network apparatuses, the path display method including: at the path display apparatus, identifying a high-speed port of a route apparatus which is the optical network apparatus, and determining a first group to which optical network apparatuses divided by the identified high-speed port belong, based on the configuration information; and displaying, on a screen, a symbol of each of the optical network apparatuses, a symbol of the connection relationship, and a symbol of the first group.

According to the disclosure described in claims 1 and 5, the display of the first group can improve the visibility of the complicated path screen display by the disaggregation.

Thus, it is possible to improve the operability of path management performed in units of apparatuses subdivided by disaggregation.

The disclosure according to claim 2 is the path display apparatus according to claim 1, wherein the grouping unit determines the first group according to a grouping algorithm or an operation of an operator.

According to the disclosure described in claim 2, the first group can be displayed automatically or manually.

The disclosure according to claim 3 is a path display apparatus for displaying a path configured for a plurality of optical network apparatuses subdivided by disaggregation, including: a storage unit that stores configuration information indicating a connection relationship of each of the optical network apparatuses; a grouping unit that identifies a route apparatus which is the optical network apparatus, and determines a second group to which optical network apparatuses divided between the route apparatuses directly connected to each other belong, based on the configuration information; and a display control unit that displays, on a screen, a symbol of each of the optical network apparatuses, a symbol of the connection relationship, and a symbol of the second group.

The disclosure according to claim 6 is a path display method at a path display apparatus for displaying a path configured for a plurality of optical network apparatuses subdivided by disaggregation, a storage unit of the path display apparatus storing configuration information, the configuration information indicating a connection relationship of each of the optical network apparatuses, the path display method including: at the path display apparatus, identifying a route apparatus which is the optical network apparatus, and determining a second group to which optical network apparatuses divided between the route apparatuses directly connected to each other belong, based on the configuration information; and displaying, on a screen, a symbol of each of the optical network apparatuses, a symbol of the connection relationship, and a symbol of the second group.

According to the disclosure described in claims 3 and 6, the display of the second group can improve the visibility of the complicated path screen display by the disaggregation.

Thus, it is possible to improve the operability of path management performed in units of apparatuses subdivided by disaggregation.

Further, only a route apparatus may be identified for grouping, so that the amount of information required for grouping may be reduced, and the convenience of displaying the path screen with a group can be improved.

The disclosure according to claim 4 is the path display apparatus according to claim 3, wherein the grouping unit determines the second group according to a grouping algorithm or an operation of an operator.

According to the disclosure described in claim 4, the second group can be displayed automatically or manually.

Effects of the Invention

According to the present disclosure, it is possible to improve the operability of path management performed in units of apparatuses subdivided by disaggregation.

DESCRIPTION OF EMBODIMENTS

Hereinafter, an embodiment for realizing the present disclosure (hereinafter, referred to as a "present embodiment") will be described with reference to the drawings.

First Embodiment

Configuration

Figure 1:
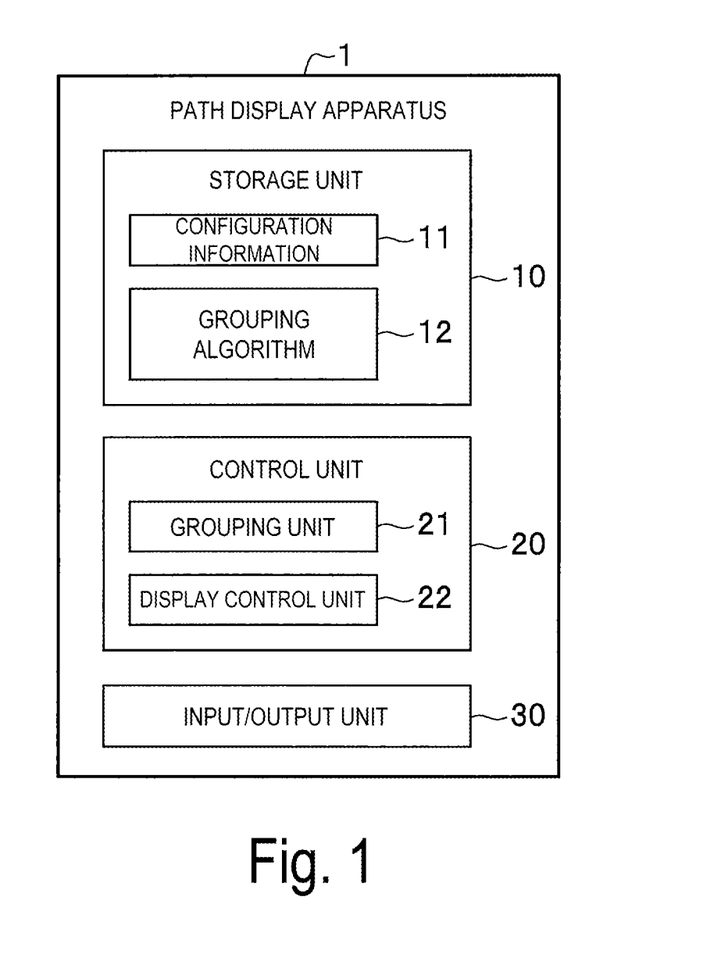
FIG. 1 is a functional configuration diagram of a path display apparatus according to a first embodiment.

A path display apparatus of the present embodiment is, for example, an apparatus corresponding to a display unit of an OSS that manages a path configured in an optical transmission system such as an ROADM system. As illustrated in FIG. 1, the path display apparatus 1 according to the present embodiment includes a storage unit 10, a control unit 20, and a hardware such as an input/output unit 30. A Central Processing Unit (CPU) which is a specific example of the control unit 20 implements the method of the present embodiment by executing a program (not illustrated) loaded on the memory which is a specific example of the storage unit 10.

The storage unit 10 is a function unit that stores various types of information. The storage unit 10 stores configuration information 11 and a grouping algorithm 12. The configuration information 11 is information indicating a connection relationship between the optical network apparatuses (apparatuses subdivided by disaggregation) disposed in the optical network.

The grouping algorithm 12 is an algorithm that enables automatic grouping by the grouping unit 21 described below.

The control unit 20 is a function unit that performs processes of the path display apparatus 1. The control unit 20 includes a grouping unit 21 and a display control unit 22. The grouping unit 21 groups optical network apparatuses that satisfy predetermined conditions. Details of the method for determining the group by the grouping unit 21 are described below.

The display control unit 22 controls a screen display of a path configured for optical network apparatuses disposed in the optical network. The screen display by the display control unit 22 includes screen display of a symbol of each of the optical network apparatuses, symbols of the connection relationships among the optical network apparatuses based on the configuration information 11, and symbols of the groups determined by the grouping unit 21.

The input/output unit 30 is an input/output interface for inputting predetermined information and outputting predetermined information. The input/output unit 30 can input predetermined information in accordance with an operation of an operator using the path display apparatus 1. The input/output unit 30 can display a screen in accordance with the control of the display control unit 22.

Method for Determining Group A method of determining a group by the grouping unit 21 will be described with reference to FIG. 2. As illustrated in the path display screen of FIG. 2, the optical network apparatuses disposed in the optical network can be classified into Direction (DIR), colorless/directionless (C/D) add/drop group: Shared risk resource group (SRG), and Transponder (TPN). However, the classification of the optical network apparatuses is not limited to the above, and other types may be prepared.

In the path screen display in the present embodiment, the sections (Optical Transmission Section (OTS)) between any two of DIR, SRG, and TPN are symbolized as solid lines. The sections indicated by the solid lines follow the configuration information 11.

The display control unit 22 can display a path on a screen, along all or some of the solid lines. However, for clarity of illustration, on the path display screen in the present embodiment, the screen display of the path is omitted.

TPN is a termination apparatus that terminates the path and converts a signal into a client signal (for example, a signal of the Ethernet (trade name) standard). In the path screen display of the present embodiment, TPN is symbolized as a rectangular shape. SRG is a multiplexer/demultiplexer that multiplexes a path and converts it into an optical signal, or disintegrates a multiplexed optical signal into a path. In the path screen display of the present embodiment, SRG is symbolized as a trapezoid. The short base side of the trapezoid indicates the shunt side, and the long base side indicates the confluent side. DIR is a route apparatus that transmits and receives multiplexed optical signals. In the path screen display of the present embodiment, DIR is symbolized as an equilateral triangle. Of the three vertices of the equilateral triangle, the vertices through which the solid line passes indicate a high-speed port (for example, amplifier (AMP)) of DIR.

Figure 2:
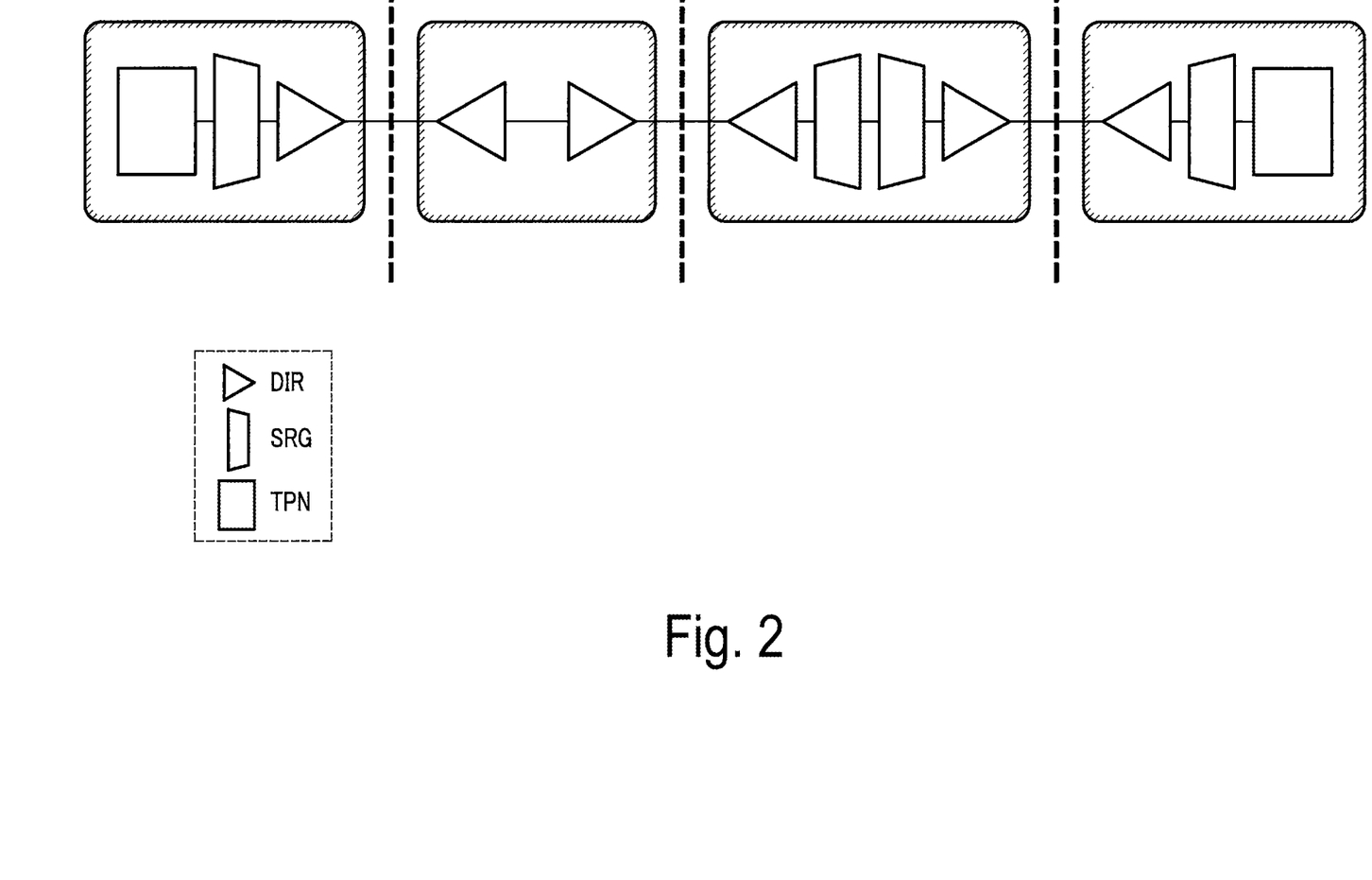
FIG. 2 is a path screen display example (1) of subdivided optical network apparatuses for which one path is configured and a group that divides subdivided optical network apparatuses.

The grouping unit 21 identifies DIRs for optical network apparatuses in the sections illustrated by the solid line in FIG. 2, and further identifies a high-speed port of DIR. In addition, the grouping unit 21 divides optical network apparatuses in a section by the identified high-speed ports. As a result, the grouping unit 21 groups non-divided optical network apparatuses into the same group. In other words, based on the configuration information 11, the grouping unit 21 determines a plurality of groups (first groups) to which optical network apparatuses divided by the identified high-speed port belong.

The display control unit 22 can screen display the group determined by the grouping unit 21. As illustrated in FIG. 2, in the path screen display of the present embodiment, divisions using high-speed ports of DIR are symbolized as vertical dashed lines. The group determined by the high-speed port of DIR is symbolized as a round square surrounding graphics symbolizing optical network apparatuses belonging to the group.

The group of optical network apparatuses may be automatically determined by the grouping unit 21 described above according to a grouping algorithm 12. The group of optical network apparatuses can also be manually determined by the operation of the input/output unit 30 by an operator using the path display apparatus 1.

Figure 3:
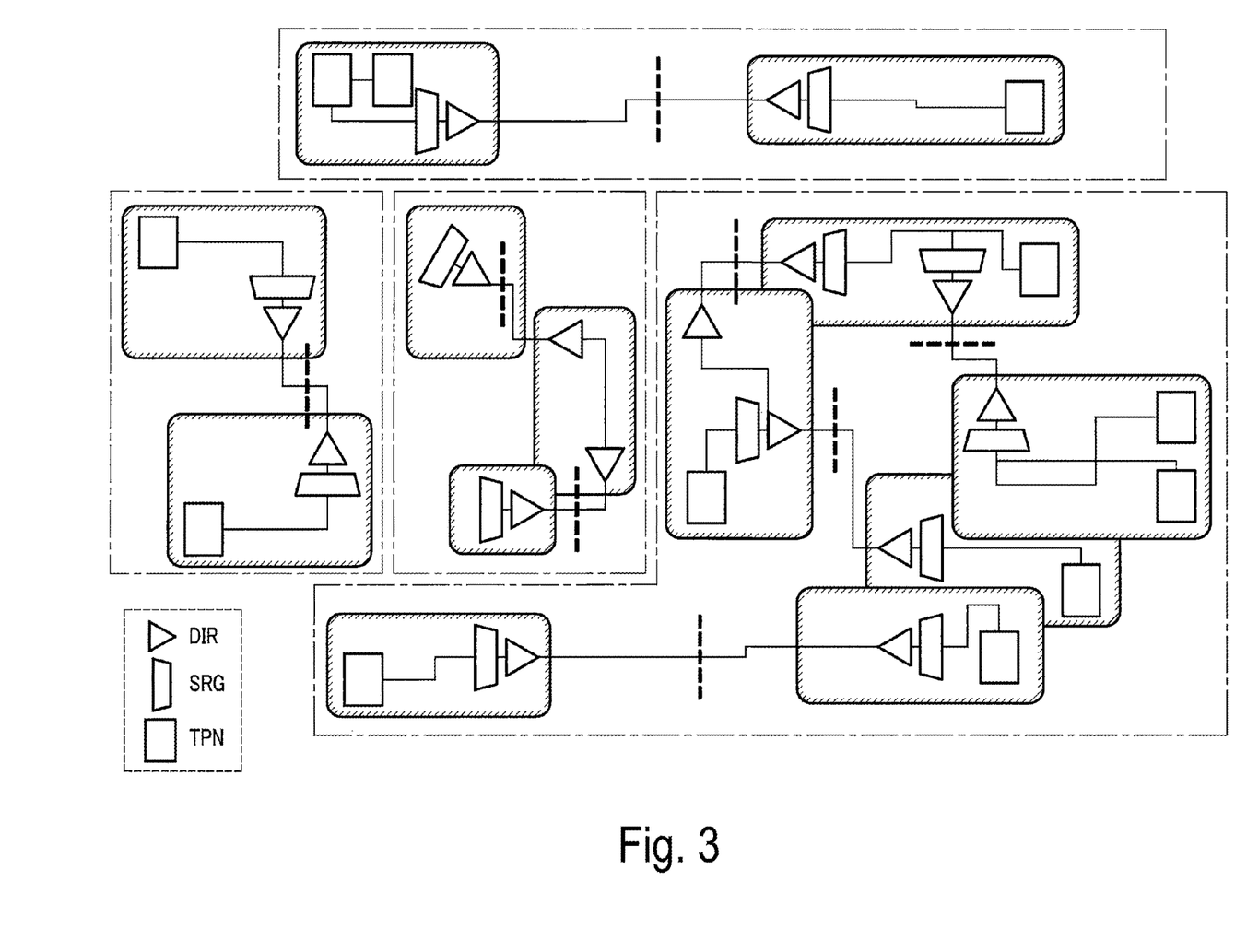
FIG. 3 is a path screen display example of subdivided optical network apparatuses for which a plurality of paths are configured and a group that divides subdivided optical network apparatuses.

As illustrated in FIG. 3, the path screen display of the present embodiment can also be applied, even in the case of a screen display in which a plurality of paths are configured in optical network apparatuses disposed whole optical network.

The surrounding lines of the dot-dash line illustrated in FIG. 3 represent sections containing optical network apparatuses that may be connected to each other. Thus, the optical network apparatuses included in the different surrounding lines are not connected to each other. The display control unit 22 can also display the surrounding line of the dot-dash line illustrated in FIG. 3. However, the surrounding line of the dot-dash line is not required in the present disclosure, and thus the display control unit 22 may not display this surrounding line on a screen.

As in FIG. 2, The grouping unit 21 identifies DIRs for optical network apparatuses in the connection relationship illustrated by the solid line in FIG. 3, and further identifies a high-speed port of DIR. In addition, the grouping unit 21 divides optical network apparatuses in a section by the identified high-speed ports. As a result, the grouping unit 21 groups non-divided optical network apparatuses into the same group. In other words, based on the configuration information 11, the grouping unit 21 determines a plurality of groups (first groups) to which optical network apparatuses divided by the identified high-speed port belong.

As illustrated in FIG. 2 and FIG. 3, division by the grouping unit 21 is performed between the high-speed ports of DIRs. Thus, the optical network apparatuses belonging to each determined group corresponds to optical transmission apparatuses of a non-disaggregation configuration. Thus, the path display apparatus 1 can display the optical transmission unit of a non-disaggregation configuration as a group.

The display of the second group can improve the visibility of the complicated path screen display by the disaggregation. Thus, it is possible to improve the operability of path management performed in units of apparatuses subdivided by disaggregation.

The operator viewing the path screen display in FIG. 2 or FIG. 3 can distinguish and recognize, based on the symbols of the groups, whether a connection (section) between optical network apparatuses subdivided by disaggregation is a connection in the group or a connection between groups. In general, long-range transmission is often performed between DIR-DIR, and is often performed between buildings in which the optical transmission apparatuses are deployed. Thus, the operator can intuitively recognize the configuration of the optical network apparatus in units of buildings, by grouping.

In addition, even if a path screen display displays sections between optical network apparatuses subdivided by disaggregation on a screen, the operator can intuitively recognize a difference in transmission distance for each section. Specifically, it is possible to intuitively recognize the difference between the wiring in a building and the wiring between buildings.

Processing

Figure 4:
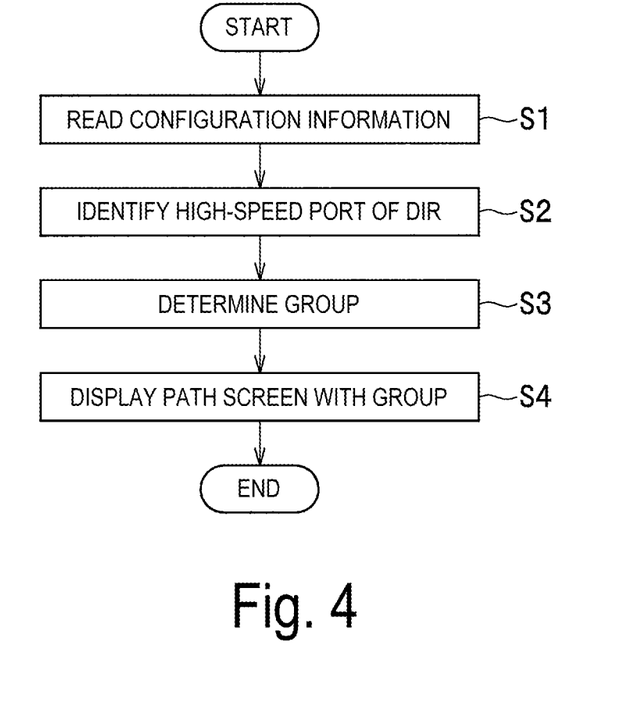
FIG. 4 is a flowchart of a path display process.

A path display process executed by the path display apparatus 1 according to the present embodiment will be described with reference to FIG. 4. The path display process starts when a path screen display is requested from the operator via the input/output unit 30.

First, the control unit 20 in the path display apparatus 1 reads the configuration information 11 from the storage unit 10 (step S1). Next, the grouping unit 21 in the path display apparatus 1 identifies the high-speed port of DIR with reference to the read configuration information 11 (step S2).

Next, the grouping unit 21 in the path display apparatus 1 divides optical network apparatuses indicated by the configuration information 11 by the high-speed port identified in step S2 to determine a group to which non-divided optical network apparatuses belongs (step S3). Finally, the display control unit 22 in the path display apparatus 1 displays a path screen with a group, on the basis of the configuration information 11 and the processing results of the grouping unit 21, via the input/output unit 30 (step S4).

In the above, the path display processing ends.

Second Embodiment

In describing the second embodiment, descriptions overlapping with the first embodiment will be omitted.

Figure 5:
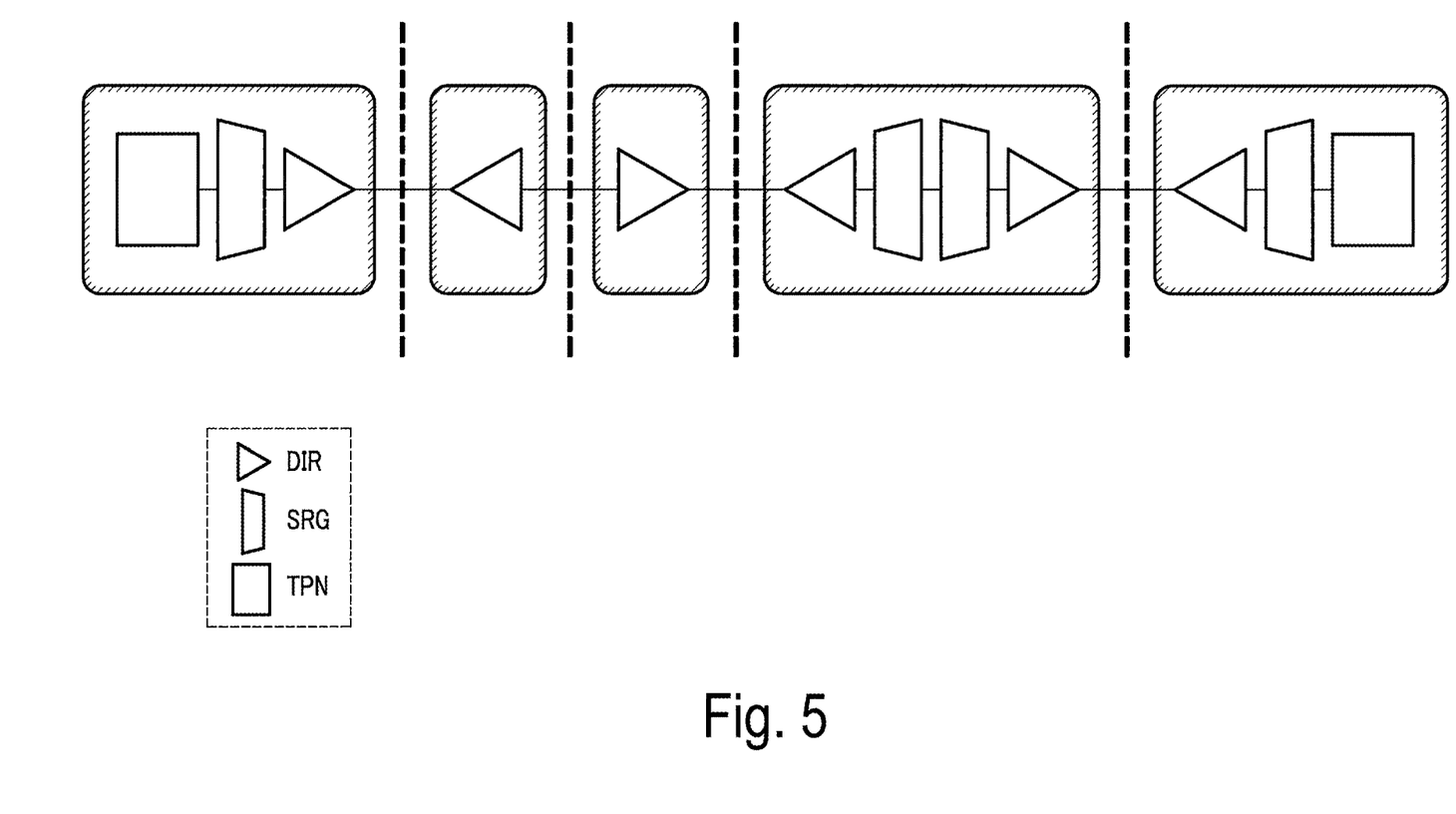
FIG. 5 is a path screen display example (2) of subdivided optical network apparatuses for which one path is configured and a group that divides subdivided optical network apparatuses, according to the second embodiment.

The grouping unit 21 identifies DIRs for optical network apparatuses in the connection relationship illustrated by the solid line in FIG. 5. Further, the grouping unit 21 divides optical network apparatuses at locations where the identified DIRs are directly connected to each other (division is symbolized as a vertical dashed line). As a result, the grouping unit 21 groups non-divided optical network apparatuses into the same group. In other words, based on the configuration information 11, the grouping unit 21 determines a plurality of groups (second groups) to which optical network apparatuses divided between DIRs that are directly connected to each other belong.

The path display process of the second embodiment differs from the path display process of the first embodiment in that DIR is identified instead of the high-speed port of the DIR (step S2 in FIG. 4), and others are the same.

According to the second embodiment, the same effects as the first embodiment is achieved.

Further, in the first embodiment, DIRs and high-speed ports of DIRs need to be identified for grouping, but DIRs alone may be identified according to the second embodiment. That is, according to the second embodiment, compared to the first embodiment, the amount of information required for grouping can be reduced, and the convenience of displaying the path screen with a group can be improved.

Even in a second embodiment, the group of optical network apparatuses may be automatically determined by the grouping unit 21 described above according to a grouping algorithm 12. The group of optical network apparatuses can also be manually determined by the operation of the input/output unit 30 by an operator using the path display apparatus 1.

Others

Even in an optical network in which a plurality of types of apparatuses are mixed, grouping by the grouping unit 21 can be realized by identifying an apparatus corresponding to DIR.

As illustrated in FIG. 2, FIG. 3, and FIG. 5, group symbols are not limited to a round square, and various display aspects can be adopted, such as color-coded display by group of optical network apparatuses in a group and display with different line types.

It is also possible to realize a technique in which various techniques described in each embodiment are appropriately combined.

The software described in the present embodiment may also be realized as hardware, and the hardware described in each embodiment may also be realized as software.

In addition, hardware, software, and flowcharts may be changed as appropriate without departing from the spirit of the present disclosure.

REFERENCE SIGNS LIST

1 Path display apparatus
10 Storage unit
11 Configuration information
12 Grouping algorithm
20 Control unit
21 Grouping unit
22 Display control unit
30 input/output unit

The invention claimed is:

1. A path display apparatus for displaying a path configured for a plurality of optical network apparatuses subdivided by disaggregation, the path display apparatus comprising:
a storage unit configured to store configuration information indicating a connection relationship of each of the optical network apparatuses;
a grouping unit configured to identify a high-speed port of a route apparatus which is the optical network apparatus, and determine a group to which optical network apparatuses divided by the identified high-speed port belong, based on the configuration information; and
a display control unit configured to display, on a screen, a symbol of each of the optical network apparatuses, a symbol of the connection relationship, and a symbol of the group.

2. The path display apparatus according to claim 1, wherein the grouping unit determines the group according to a grouping algorithm or an operation of an operator.

3. A path display apparatus for displaying a path configured for a plurality of optical network apparatuses subdivided by disaggregation, the path display apparatus comprising:
a storage unit configured to store configuration information indicating a connection relationship of each of the optical network apparatuses;
a grouping unit configured to identify a route apparatus which is the optical network apparatus, and determine a group to which optical network apparatuses divided between the route apparatuses directly connected to each other belong, based on the configuration information; and
a display control unit configured to display, on a screen, a symbol of each of the optical network apparatuses, a symbol of the connection relationship, and a symbol of the group.

4. The path display apparatus according to claim 3, wherein the grouping unit determines the group according to a grouping algorithm or an operation of an operator.

5. A path display method at a path display apparatus for displaying a path configured for a plurality of optical network apparatuses subdivided by disaggregation, a storage unit of the path display apparatus storing configuration information, the configuration information indicating a connection relationship of each of the optical network apparatuses, the path display method comprising:
identifying, at the path display apparatus, a route apparatus which is the optical network apparatus, and determining a group to which optical network apparatuses divided between the route apparatuses directly connected to each other belong, based on the configuration information; and
displaying, on a screen, a symbol of each of the optical network apparatuses, a symbol of the connection relationship, and a symbol of the group.

* * * * *